No. 802,543. PATENTED OCT. 24, 1905.
J. W. YOCHEM.
DASHBOARD HOLDER.
APPLICATION FILED JUNE 13, 1905.
3 SHEETS—SHEET 1.
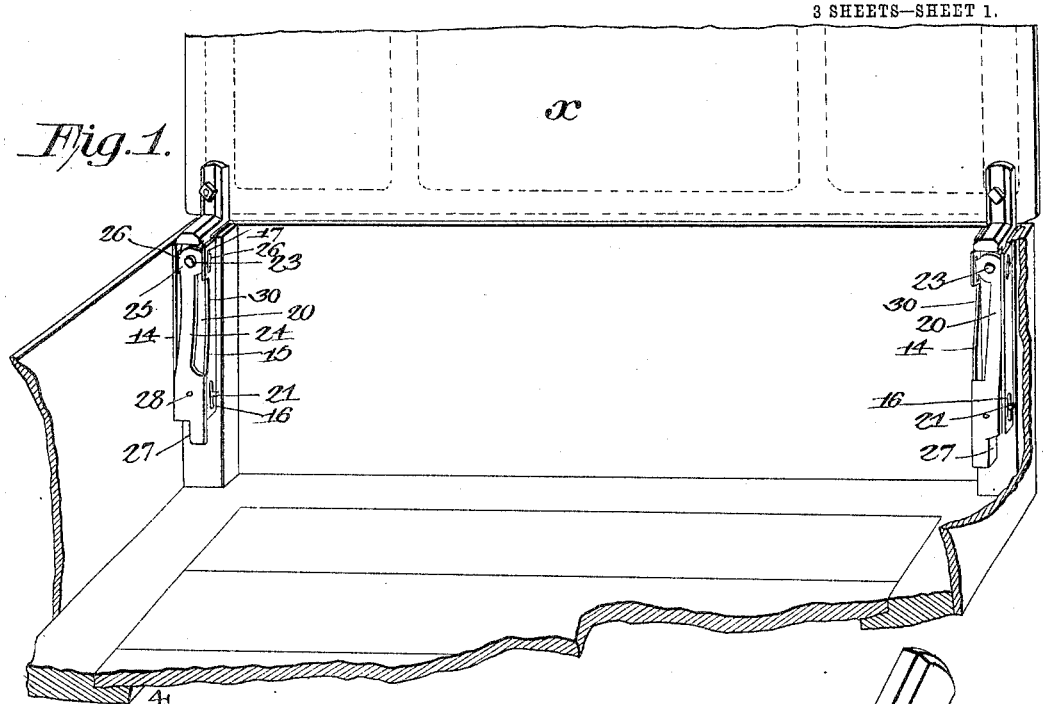
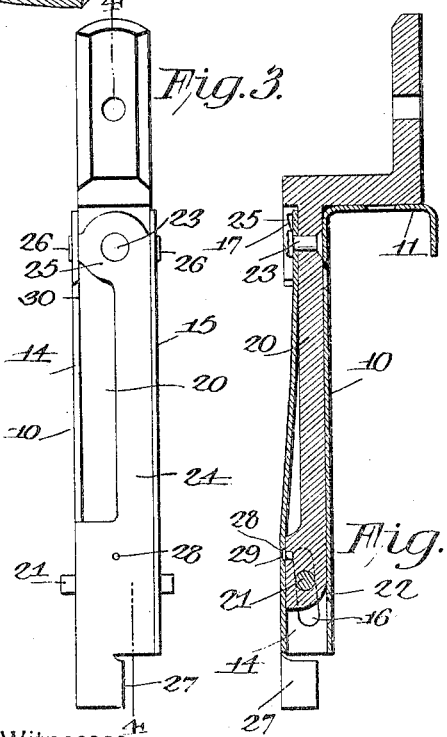
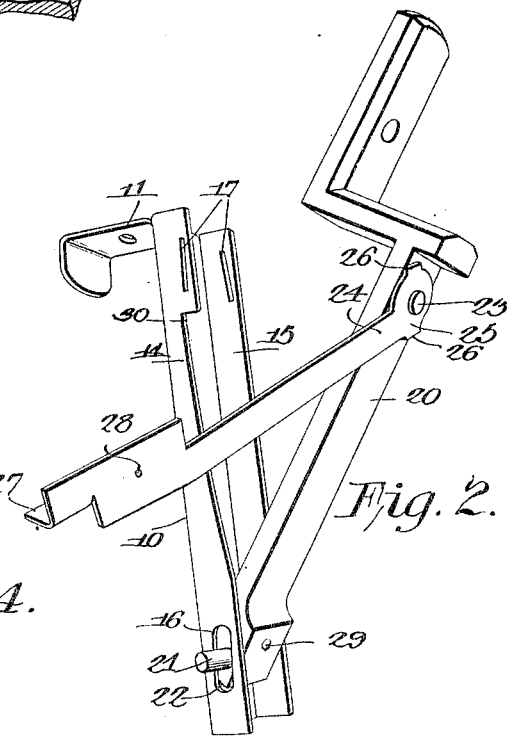
Witnesses
John W. Yochem, Inventor
by C. A. Snow & Co.
Attorneys No. 802,543. PATENTED OCT. 24, 1905.
J. W. YOCHEM.
DASHBOARD HOLDER.
APPLICATION FILED JUNE 13, 1905.

3 SHEETS—SHEET 2.

Witnesses

John W. Yochem,
Inventor by C. A. Snow & Co.
Attorneys

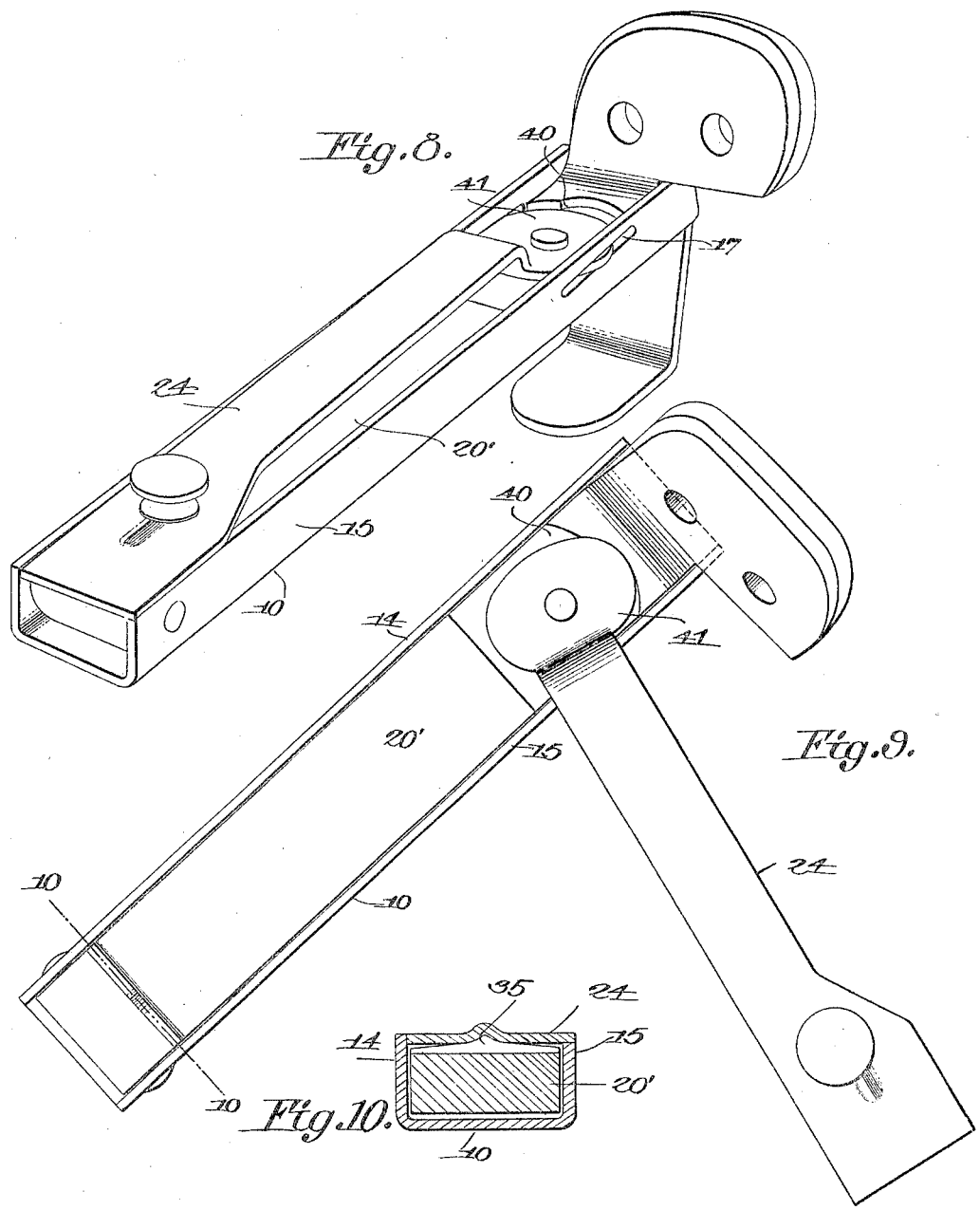

UNITED STATES PATENT OFFICE.

JOHN W. YOCHEM, OF TIFFIN, OHIO.

DASHBOARD-HOLDER.

No. 802,543.  Specification of Letters Patent.  Patented Oct. 24, 1905.

Application filed June 13, 1905. Serial No. 265,060.

*To all whom it may concern:*

Be it known that I, JOHN W. YOCHEM, a citizen of the United States, residing at Tiffin, in the county of Seneca and State of Ohio, have invented a new and useful Dashboard-Holder, (Case B,) of which the following is a specification.

This invention relates to dashboard-connecting devices for vehicles, and has for its principal object to provide a means for adjustably connecting the dash in such manner as to permit its swinging from normal position in order to permit the swinging upward of the thills and the storing of the vehicle in a comparatively small space.

A further object of the invention is to provide a dash connection of such nature that when the dash is once adjusted to proper position it may be rigidly locked and rattling or loose play prevented.

A still further object of the invention is to provide a dash with a pivotal connecting means so arranged that it may be quickly locked or unlocked and in which the locking device serves also as a clamp for preventing play of the pivoted members.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 5:
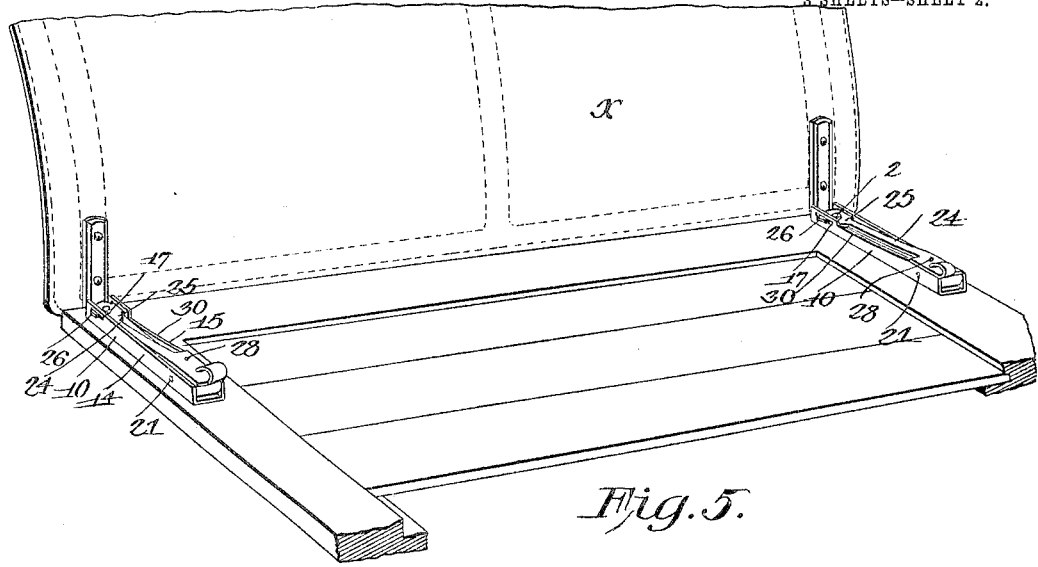
Figures 6, 7:
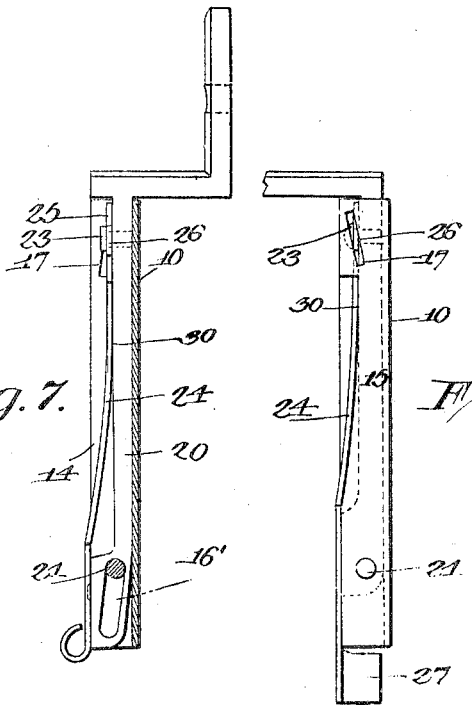

In the accompanying drawings, Figure 1 is a perspective view of the front portion of a vehicle, illustrating a dash-connecting device constructed in accordance with the invention. Fig. 2 is a detail perspective view of one of the dash connections in open position. Fig. 3 is an elevation of the same in closed position. Fig. 4 is a vertical section of the device on the line 4 4 of Fig. 3. Fig. 5 is a detail perspective view of the connection as applied to another type of vehicle. Fig. 6 is a sectional elevation of the same. Fig. 7 illustrates a slightly-modified construction of the device shown in Fig. 2. Fig. 8 is a detail perspective view, on an enlarged scale, of a dash-connecting device adapted especially for use in securing large dashes to phaetons and the like. Fig. 9 is a plan view of the same with the lever-locking device in release position. Fig. 10 is a transverse sectional view on the line 10 10 of Fig. 9 with the locking-spring in closed position.

Similar characters of reference are employed to indicate corresponding parts throughout the several figures of the drawings.

In buggies and other vehicles the dash usually prevents proper adjustment of the thills to an extent sufficient to bring the floor-space occupied within the limits of the vehicle itself.

In carrying out the present invention the dash $x$ is pivotally connected to the front of the vehicle, the pivotal connections being such that the dash may be swung rearward and is thus removed from the path of the thills.

Where the device is used in connection with buggies, a channel-bar 10 is rigidly secured at the front corners of the box, said channel-bar being preferably provided with an overhanging finger 11 to assist in holding the same in place and screws or other securing devices being employed for rigidly holding the bar in position. The channel-bar has two parallel webs 14 and 15, and near the lower ends of said webs are elongated slots 16, arranged on lines oblique to the main web of the channel-bar and inclining inward toward said bar from the top downward. In the upper portion of each of the side webs is arranged an inclined slot 17, said slots inclining, respectively, in opposite directions. Fitting within the channel-bar is a dash-supporting bar 20, the outer end of which is of any suitable construction, being shown in different forms in Figs. 1 and 5, as required by the character of the vehicle. In the lower end of this bar is secured a transversely-extending pin 21, the opposite ends of which project through the slots 16, and the rear face of the bar is arranged on a curved line, as at 22 in Fig. 4, so that the bar may be swung outward with the pin 21 as a fulcrum in order to permit movement of the dash to the rear. The outer face of the upper portion of the bar 20 carries a pivot-pin 23, on which is fulcrumed a lever 24, preferably formed of spring-steel or other elastic material. This lever has a rounded head 25, from which projects two tongues 26, the tongues being diametrically opposite each other and arranged to enter the inclined cam-slots 17 in the webs 14 and 15, and when the bar 20 is fully within the channel-bar and the lever 24 is turned the tongues 26 will enter the inclined cam-grooves 17 and will firmly force the bar 20 against the rear web of the channel-bar, forming a rigid lock that will positively prevent any rattling or loose play.

The spring locking-lever 24 is provided at its free end with a projecting portion 27, that forms a handle, and in the lower face of the lever is a recess 28, which receives a projecting lug 29, carried by the bar 20, and serves as a lock for holding the lever from swinging movement, it being necessary in operation to first pull outward on the free end of the lever in order that the lug may be disengaged from the recess. To permit the movement of the lever, the web 14 is cut away, as shown in Fig. 2, and forms an inclined plane or cam 30, up which the free end of the lever may ride as it approaches a position parallel with the bar 20, so that during the locking movement it is merely necessary to turn the lever from the angular position shown in Fig. 2 to the position shown in Fig. 3.

The slots 16, formed in the lower portion of the channel-bar, serve to permit upward movement of the bar 20 to a limited extent after said bar is unlocked, this being necessary in order that the dash may be swung inward over the side walls of the buggy-box. These slots are inclined in the direction shown in Fig. 4, so that as the bar is moved downward its lower end will be forced closely against the main web of the channel-bar, and thus firmly held from rattling.

In the construction shown in Fig. 6 the slots will not be necessary, for the reason that the vehicle has open sides, which will not interfere with the backward movement of the dash.

Fig. 7 illustrates a slightly-modified construction in which the slot 16' is placed in the lower end of the bar 20 instead of the side webs of the channel-bar, the construction otherwise remaining the same as described.

In the modified construction illustrated in Figs. 8, 9, and 10 the dash-attaching gear is much wider than the construction illustrated in the other figures to permit the securing of large dashes or the employment of an auxiliary brace-bar at the lower portion of the dash. In this case also the bar 20' is provided near one end with a recess 40 for the reception of a locking-lever 41, the head of which when in open position will abut against one wall of the recess, as shown in Fig. 9. This locking-lever is bent upward to pass over the side web of the channel-bar and is of such construction that it cannot engage the dashboard or scrape over any of the painted surface of the dash or vehicle when opened or closed. When in closed position, the handled operating-lever of the spring locking-lever abuts against one of the side flanges or webs of the channel-bar and fits over the opposite web of the bar. The bar 20 is provided with a short rib 35, which engages in a recess formed in the lower face of the locking-lever and retains the same in closed position.

Having thus described the invention, what is claimed is—

1. A dash-support comprising a pair of pivotally-connected members, and a locking device serving as a cam for forcing the members firmly into contact to prevent rattling.

2. A dash-support comprising a pair of pivotally-connected members, one of which is arranged for the reception of the other and provided with cam-slots, and a locking member carried by the second member and arranged to enter said cam-slots.

3. A dash-support comprising a pair of pivotally-connected members, and means for locking said members to each other at a point distant from the pivot.

4. A dash-support comprising a pair of pivotally-connected members, and a positive locking means arranged between the two members at a point distant from the pivot and serving to prevent independent movement of either member in any direction.

5. A dash-support comprising a channel-bar having cam-slots, a second bar pivoted to such channel-bar, and a locking-lever carried by the second bar and having projecting tongues arranged to enter said cam-slots.

6. A dash-support, comprising a channel-bar having cam-slots, a second bar pivotally connected to the channel-bar, and an elastic locking-lever having tongues arranged to enter said cam-slots.

7. A dash-support comprising a channel-bar, and a second bar pivoted thereto, the channel-bar having cam-slots, and one of its webs being cut away to form an elongated cam-surface, and an elastic lever having projecting tongues arranged to enter said cam-slots, the lever riding over said cam-surface to and from locking position.

8. A dash-support comprising a channel-bar, the opposite webs of which are provided with cam-slots, one of the webs being cut away to form an elongated cam-surface, a second bar pivoted within the channel-bar, a locking-lever pivoted to said bar and having an elastic handle-piece projecting from said lever, and arranged to enter the cam-slots, and an impositive locking-lever between the cam-lever and the second bar.

9. A dash-support comprising a pair of pivotally-connected members, the pivotal connection being slotted to permit longitudinal movement of said members and the raising of the dash preliminary to its rearward movement.

10. A dash-support comprising a pair of members, one having a pivot-pin, and the other being slotted for the reception of the pin to permit vertical movement of the dash in advance of the rearward movement thereof, the slot being inclined and forming a cam for rigidly locking the two members.

11. A dash-support comprising a channel-bar having a cam-slot, a second bar pivotally connected to the channel-bar and having a recessed outer face, and an elastic locking-lever having a head portion pivoted within the recessed portion of the bar, the head of said lever being provided with tongues arranged to enter said cam-slot.

In testimony that I claim the foregoing as my own I have hereto affixed my signature in the presence of two witnesses.

JOHN W. YOCHEM.

Witnesses:
 FRANK T. DOW,
 RALPH W. FACINGER.